US012785539B2

(12) United States Patent
Renaudineau et al.

(10) Patent No.: US 12,785,539 B2
(45) Date of Patent: Nov. 3, 2026

(54) POWER INVERTER

(71) Applicant: UNIVERSIDAD TÉCNICA FEDERICO SANTA MARÍA, Valparaíso (CL)

(72) Inventors: Hugues Jean-Marie Renaudineau, Valparaíso (CL); Freddy Arturo Flores Bahamonde, Santiago (CL); Samir Felipe Kouro Renaer, Viña del Mar (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 205 days.

(21) Appl. No.: 18/270,700

(22) PCT Filed: Dec. 28, 2021

(86) PCT No.: PCT/CL2021/050128
§ 371 (c)(1),
(2) Date: Aug. 4, 2023

(87) PCT Pub. No.: WO2022/140874
PCT Pub. Date: Jul. 7, 2022

(65) Prior Publication Data

US 2024/0297570 A1 Sep. 5, 2024

(30) Foreign Application Priority Data

Dec. 30, 2020 (CL) .................................. 3445-2020

(51) Int. Cl.
*H02M 1/12* (2006.01)
*H02M 1/00* (2006.01)
(Continued)

(52) U.S. Cl.
CPC ............ *H02M 1/007* (2021.05); *H02M 1/12* (2013.01); *H02M 3/33573* (2021.05); *H02M 7/53871* (2013.01)

(58) Field of Classification Search
CPC ........ H02M 1/007; H02M 1/12; H02M 3/335; H02M 3/33573; H02M 7/53871
See application file for complete search history.

(56) References Cited

U.S. PATENT DOCUMENTS 5,404,082 A * 4/1995 Hernandez .......... H02M 1/4241 315/307
6,097,158 A * 8/2000 Manor .................. H02M 7/217 307/66
(Continued)

FOREIGN PATENT DOCUMENTS

EP 2820752 B1 3/2020
JP 2009207234 A 9/2009
TW 201223075 A1 6/2012

OTHER PUBLICATIONS

International Search Report dated Mar. 30, 2022, in PCT/CL2021/050128.
(Continued)

*Primary Examiner* — Gary L Laxton
(74) *Attorney, Agent, or Firm* — PROCOPIO, CORY, HARGREAVES & SAVITCH LLP

(57) ABSTRACT

The invention provides a single-stage partial power inverter for transforming a DC signal into an AC signal comprising: a galvanically isolated DC-DC converter in a partial power configuration, having a voltage input and a voltage output; an inverter bridge connected to said voltage output of the DC-DC converter in a partial power configuration; a control loop configured to control a switching cycle of the DC-DC converter; wherein said control loop is configured to control said switching cycle of the DC-DC converter so that the
(Continued)

voltage signal at said voltage output has a rectified AC waveform, said rectified AC waveform having a frequency that is twice a fundamental frequency of said AC signal; and wherein said inverter bridge is operated at a switching frequency that is twice the fundamental frequency of said AC signal.

12 Claims, 3 Drawing Sheets

(51) Int. Cl.
*H02M 3/335* (2006.01)
*H02M 7/5387* (2007.01)

(56) References Cited

U.S. PATENT DOCUMENTS 7,193,872 B2 * 3/2007 Siri ................... H02M 7/53803 363/95
9,214,815 B2 12/2015 Okui
10,116,221 B2 10/2018 Iwaya et al.
2002/0017822 A1 * 2/2002 Umemura ............... H02J 7/345 307/66
2010/0142236 A1 * 6/2010 Lee ....................... H02M 1/143 363/74
2014/0049998 A1 2/2014 Casey et al.

OTHER PUBLICATIONS

Zapata et al., "Partial Power DC-DC Converters for Two Stage Photovoltaic Energy Conversion Systems," May 30, 2018 https://repositorio.usm.cl/handle/11673/40704.
Zapata et al., "Step-Down Partial Power DC-DC Converters for Two-Stage Photovoltaic String Inverters," Jan. 12, 2019 https://www.researchgate.net/publication/330373974_Step-Down_Partial_Power_DC-DC_Converters_for_Two-Stage_Photovoltaic_String_Inverters.
Zapata et al., "Partial Power DC-DC Converter for Photovoltaic Microinverters," Oct. 23, 2016 IEEE IECON2016 https://doi.org/10.1109/IECON.2016.7793098.

* cited by examiner (State of the Art)

(State of the Art)

(State of the Art)

POWER INVERTER

TECHNICAL FIELD OF INVENTION

The present invention relates to the field of electrical power generation, conversion or distribution, more specifically to the field of converting a DC input into an AC output, and in particular provides a single-stage partial power inverter.

BACKGROUND OF THE INVENTION

Within the field of energy conversion, partial power converters have become relevant in recent times. In general, partial power converters are known to have intrinsic advantages, such as reduced power losses, system size and cost. The underlying principle is that power is split between a direct power link between the input and output, and a portion that is processed by a power converter.

However, to obtain an AC signal at the output of the converter having a DC input, a DC-AC converter is usually connected to the output of a DC-DC converter. This is commonly referred to as a two-stage inverter. For example, FIG. 1 illustrates a two-stage inverter of the prior art, wherein the DC-DC converter is arranged in a full power configuration, while FIG. 2 illustrates a two-stage inverter of the prior art, wherein the DC-DC converter is arranged in a partial power configuration.

Solutions of this type are described in the prior art. For example, patent document US 2014/049998 describes a DC to AC power converter. This document describes a partial power DC-DC converter connected to an inverter bridge operating at the desired AC signal frequency. In addition, a filter is described, downstream of the inverter bridge, consisting of two coils and a capacitor, where the AC signal is obtained from the capacitor. However, the signal at the output of the DC-DC converter is a DC signal, as illustrated in FIG. 3.

There is a need in the prior art to obtain a single-stage partial power inverter for converting a DC signal into an AC signal.

SUMMARY OF THE INVENTION

The present invention provides a single-stage partial power inverter for transforming a DC signal into an AC signal, comprising: a galvanically isolated DC-DC converter in a partial power configuration, having a voltage input and a voltage output; an inverter bridge connected to said voltage output of said DC-DC converter in a partial power configuration; and a control loop, configured to control a switching cycle of said DC-DC converter; wherein said control loop is configured to control said switching cycle of said DC-DC converter such that a voltage signal at said voltage output has a rectified AC waveform, said rectified AC waveform having a frequency that is twice a fundamental frequency of said AC signal; and wherein said inverter bridge is operated at a switching frequency that is twice the fundamental frequency of said AC signal.

In a preferred embodiment, the single-stage partial power inverter additionally comprises a filter downstream of said inverter bridge, said filter being selected from a group consisting of active filters, passive filters, and a combination thereof. In a more preferred embodiment, said filter is an inductive-capacitive filter, and that said inductive-capacitive filter is designed to filter harmonics from the AC signal.

In another preferred embodiment, the single-stage partial power inverter additionally comprises a filter connected to said voltage input of said DC-DC converter, said filter being selected from a group consisting of active filters, passive filters, and a combination thereof. In a more preferred embodiment, said filter is a capacitive filter.

In a preferred embodiment of the single-stage partial power inverter, said DC-DC converter is selected from a group consisting of forward converters, push-pull converters, H-bridge converters, flyback converters, half bridge converters, and Ćuk converters.

In another preferred embodiment, the single-stage partial power inverter is comprising a plurality of galvanically isolated DC-DC converters, each of said plurality of galvanically isolated DC-DC converters in a partial power configuration, each of said plurality of galvanically isolated DC-DC converters having a voltage input and a voltage output; wherein said plurality of galvanically isolated DC-DC converters are connected together in a configuration that is selected from a group consisting of input-series, output-series (ISOS); input-series, output-parallel (ISOP); input-parallel, output-series (IPOS); and input-parallel, output-parallel (IPOP); wherein said control loop is configured to control a switching cycle of each of said plurality of galvanically isolated DC-DC converters; and wherein said control loop is configured to control said switching cycle of each of said plurality of galvanically isolated DC-DC converters such that a voltage signal at each of said voltage outputs of said plurality of galvanically isolated DC-DC converters has a rectified AC waveform, said rectified AC waveform having a frequency that is twice a fundamental frequency of said AC signal.

In a further preferred embodiment of the partial power inverter, said control loop comprises a multiplier; a current comparator downstream of said multiplier; and a switching signal generator downstream of said current comparator; wherein said multiplier receives as a first input a DC input signal and as a second input a sinusoidal signal with a frequency and phase of said AC signal.

In another preferred embodiment of the partial power inverter, said control loop comprises a voltage comparator; a multiplier downstream of said voltage comparator; a current comparator downstream of said multiplier; and a switching signal generator downstream of said current comparator; wherein said voltage comparator receives as a first input a DC input signal and as a second input a DC voltage signal that maximizes power transfer; and wherein said multiplier receives as a first input the output signal of said voltage comparator and as a second input a sinusoidal signal with a frequency and phase of said AC signal.

In a further preferred embodiment of the single-stage partial power inverter, said control loop comprises a maximum power point tracker; a voltage comparator downstream of said maximum power point tracker; a multiplier downstream of said voltage comparator; a current comparator downstream of said multiplier; and a switching signal generator downstream of said current comparator; wherein said multiplier receives as a first input the output signal of said voltage comparator and as a second input a sinusoidal signal with a frequency and phase of said AC signal.

DETAILED DESCRIPTION OF THE INVENTION

The single-stage partial power inverter (1) which is the subject matter of the present invention will be described below in detail, referring for this purpose to the figures accompanying the present application.

Figure 1:
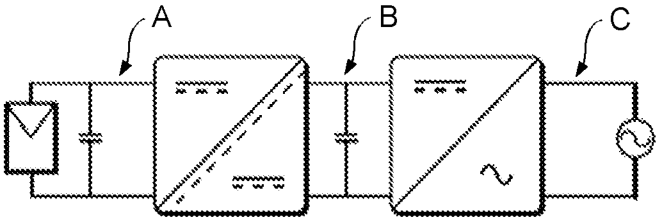
FIG. 1 schematically illustrates a first example of a two-stage inverter of the prior art.
Figure 2:
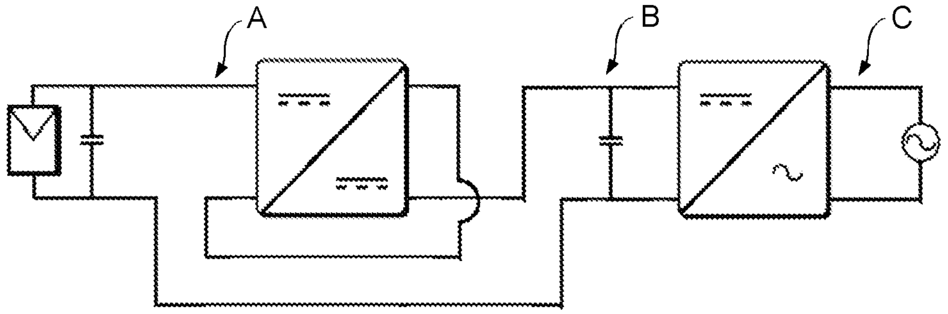
FIG. 2 schematically illustrates a second example of a two-stage inverter of the prior art.
Figure 3:
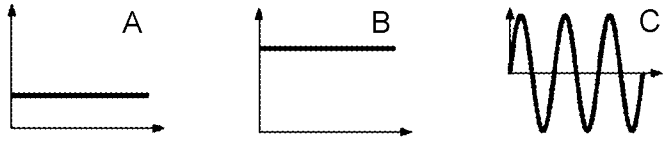
FIG. 3 schematically illustrates the voltage signals at points A, B, and C, respectively, of the inverters illustrated in FIGS. 1 and 2.
Figure 4:
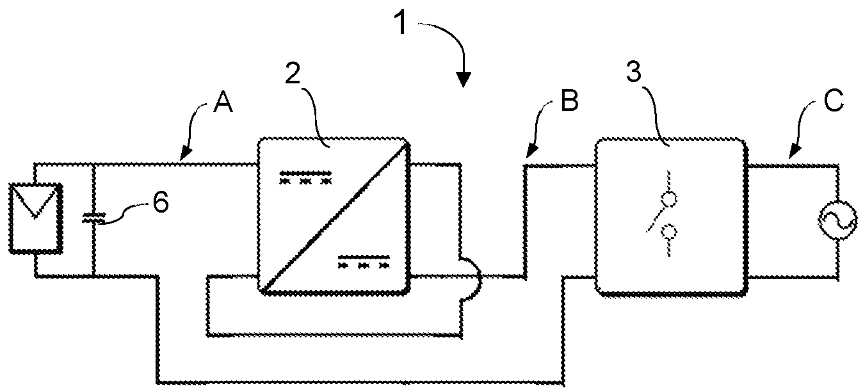
FIG. 4 schematically illustrates a first embodiment of the single-stage partial power inverter which is the subject matter of the present invention.
Figure 6:
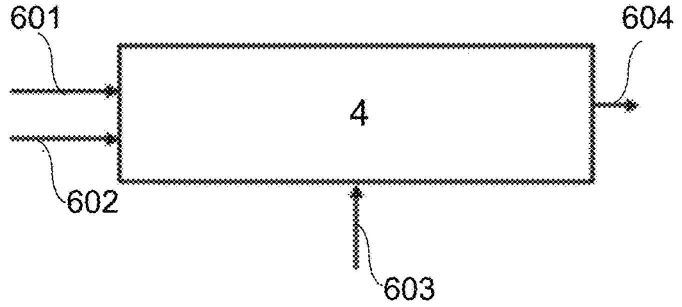
FIG. 6 schematically illustrates a block corresponding to a first embodiment of the control loop forming part of the single-stage partial power inverter which is the subject matter of the present invention.
Figure 7:
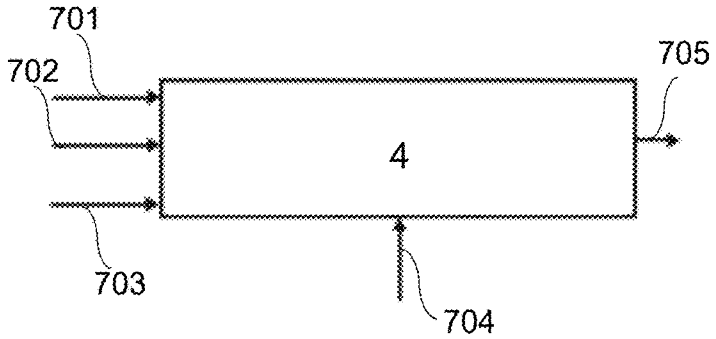
FIG. 7 schematically illustrates a block corresponding to a second embodiment of the control loop forming part of the single-stage partial power inverter which is the subject matter of the present invention.

As illustrated schematically in FIGS. 4, 6, and 7, the present invention provides a single-stage partial power inverter (1) for transforming a DC signal into an AC signal comprising, essentially:

- a galvanically isolated DC-DC converter (2) in a partial power configuration, having a voltage input (A) and a voltage output (B);
- an inverter bridge (3) connected to said voltage output (B) of said DC-DC converter (2) in a partial power configuration; and
- a control loop (4), configured to control a switching cycle of said DC-DC converter (2).

Wherein said control loop (4) is configured to control said switching cycle of said DC-DC converter (2) such that a voltage signal at said voltage output (B) has a rectified AC waveform, said rectified AC waveform having a frequency which is twice a fundamental frequency of said AC signal. Additionally, said inverter bridge (3) is operated at a switching frequency which is twice the fundamental frequency of said AC signal.

Figure 5:
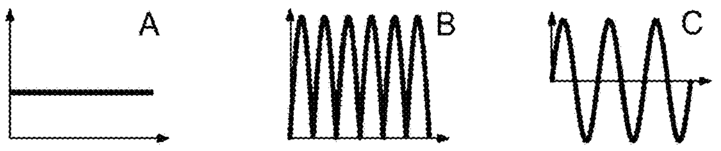
FIG. 5 schematically illustrates the voltage signals at points A, B, and C, respectively, of the single-stage partial power inverter which is the subject matter of the present invention.

As previously mentioned, there is a need in the prior art to obtain a single-stage partial power inverter for the conversion of a DC signal into an AC signal. The present invention, advantageously and without limiting the scope of the present invention, solves said problem by controlling the switching cycle of the DC-DC converter (2) such that the voltage signal at the output (B) thereof is not a DC signal, but a rectified AC signal, as schematically illustrated in FIG. 5B. Said signal is then conveniently unfolded by an inverter bridge to obtain an AC signal, as schematically illustrated in FIG. 5C. In the prior art, it is recognized that such a solution does not add an additional stage to the power converter, so the partial power inverter (1) which is the subject matter of the present invention can be considered as a single-stage inverter.

Hereinafter, for simplicity and without limiting the scope of the present invention, the single-stage partial power inverter (1), which is the subject matter of the present invention, will be interchangeably referred to as inverter (1), partial power inverter (1), or single-stage partial power inverter (1).

In the context of the present invention, without limiting the scope of the same, a DC-DC converter (2) will be understood as a set of electrical and electronic components arranged such that, in response to a continuous (DC) input signal, it can generate a DC output signal. In its normal operation, without limiting the scope of the present invention, the relation between the input voltage (A) and the output voltage (B) of a DC-DC converter (2) is controlled by the ratio between the opening time and the closing time of one or more switches forming part of said DC-DC converter (2), which is commonly referred to as a switching cycle. However, as previously mentioned, in the case of the partial power inverter (1) which is the subject matter of the present invention, said switching cycle is controlled so as to obtain a rectified AC signal at the output (B) of said DC-DC converter (2).

The DC-DC converter (2) forming part of the partial power inverter (1) which is the subject matter of the present invention is connected in a partial power configuration. In the prior art, two types of partial power DC-DC converters are recognized, namely type I, where the power splitting is performed on the input side (A) of the DC-DC converter (2), and type II, where the power splitting is performed on the output side of the DC-DC converter (2). Additionally, within each configuration (type I or type II) there is a step-up configuration, in which the output voltage is higher than the input voltage, and a step-down configuration, in which the output voltage is lower than the input voltage. There is, in addition, for each configuration (type I or type II) a step-up-step-down configuration in which the output voltage can be either higher or lower than the input voltage. Although the figures accompanying the present invention illustrate a DC-DC converter (2) in a type II configuration, any of the partial power configurations known in the prior art can be used in the inverter (1) which is the subject matter of the present invention without this limiting the scope of the present invention.

Additionally, the DC-DC converter (2) forming part of the inverter (1) that is the subject matter of the present invention may be any type of galvanically isolated DC-DC converter (2) without limiting the scope of the present invention. In a more preferred embodiment, without limiting the scope of the present invention, said DC-DC converter (2) may be a galvanically isolated converter which may be selected, for example and without limiting the scope of the present invention, from a group consisting of forward converters, push-pull converters, H-bridge converters, flyback converters, half bridge converters, and Ćuk converters. Additionally, said DC-DC converter (2) may be unidirectional or bidirectional without limiting the scope of the present invention. The unidirectional or bidirectional nature will depend, for example and without limiting the scope of the present invention, on the specific application given to the partial power inverter (1) which is the subject matter of the present invention.

For example, and without limiting the scope of the present invention, when the partial power inverter (1) which is the subject matter of the present invention is used to connect a solar photovoltaic module to a distribution network, said DC-DC converter (2) may be unidirectional. In another example, without limiting the scope of the present invention, when the partial power DC-DC inverter (1) which is the subject matter of the present invention is used to connect a battery to an engine of an electric vehicle, said DC-DC converter (2) may be a bidirectional converter, which allows incorporating energy regeneration elements in said electric vehicle.

In a preferred embodiment, without limiting the scope of the present invention, said DC-DC converter (2) may comprise a transformer (21) having a primary and a secondary, an H-bridge (22) connected to the primary of said transformer (21), and a bridge rectifier (23) connected to the secondary of said transformer (21). The relation between the number of turns of the primary and the secondary of said transformer (21) does not limit the scope of the present invention.

In a more preferred embodiment, without limiting the scope of the present invention, said transformer (21) may feature a center-tapped secondary. In this preferred embodiment, without limiting the scope of the present invention, said bridge rectifier (23) may be replaced by two rectifier diodes, each connected to one end of said secondary.

The partial power inverter (1) which is the subject matter of the present invention further comprises an inverter bridge (3) connected to the voltage output (B) of said DC-DC converter (2) in a partial power configuration. In the context of the present invention, an inverter bridge (3) will be understood as a set of electrical and electronic elements that allow the unfolding of the rectified AC signal obtained at said voltage output (B) of said DC-DC converter (2) in a partial power configuration. Said inverter bridge (3) may comprise, for example and without limiting the scope of the present invention, an H-bridge, consisting of four switches which are operated alternately, two and two. Said switches may be unidirectional or bidirectional without limiting the scope of the present invention. In a preferred embodiment, without limiting the scope of the present invention, each of said switches may be unidirectional and comprise a transistor connected in parallel with a rectifier diode. Said transistor, in turn, may be a bipolar transistor or a field effect transistor without limiting the scope of the present invention. However, in other preferred embodiments, it is possible to obtain a bidirectional switch by connecting two unidirectional switches parallel to each other.

Additionally, said inverter bridge (3) is operated at a switching frequency which is twice the fundamental frequency of the AC signal to be obtained. Thus, the signal obtained at the output (C) of said inverter bridge (3) is an AC signal having substantially the frequency of the AC signal to be obtained. However, in other embodiments and without limiting the scope of the present invention, the signal obtained at said output (C) of said inverter bridge (3) may have additional frequency components to the frequency of AC signal to be obtained, as will be explained below. In said preferred embodiment, without limiting the scope of the present invention, the partial power inverter (1) which is the subject matter of the present invention may additionally comprise a filter (5) downstream of said inverter bridge (3). Said filter (5) may be an active filter or a passive filter, as well as a combination thereof, without limiting the scope of the present invention. For example, as illustrated in FIG. 7 and without limiting the scope of the present invention, said filter (3) may be an inductive-capacitive filter. In these preferred embodiments, said filter (5) is configured so as to filter out unwanted harmonics.

The partial power inverter (1), which is the subject matter of the present invention, further comprises a control loop (4) configured to control the switching cycle of said DC-DC converter (2).

As previously mentioned, advantageously and without limiting the scope of the present invention, said control loop (4) is configured to control said switching cycle of said DC-DC converter (2) such that the voltage signal at said voltage output (B) has a rectified AC waveform, as schematically illustrated in FIG. 5B. Said rectified AC waveform has a frequency that is twice the fundamental frequency of the AC signal to be obtained.

Any implementation of said control loop (4) that allows to control the switching cycle of said DC-DC converter (2) in a partial power configuration, such as to obtain said rectified AC signal at the output (B) of said DC-DC converter (2) can be used without limiting the scope of the present invention. Generally speaking, without limiting the scope of the present invention, a person ordinarily skilled in the art will note that the nature of said control loop (4) will depend, among others and without limiting the scope of the present invention, on the topology of said DC-DC converter (2), on the type (I or II) of partial power configuration in which said DC-DC converter (2) is connected, on the voltage ranges acquired by the input signal (A), and on the amplitude, frequency, and phase ranges of the AC signal to be obtained.

FIG. 6 schematically illustrates a block corresponding to a first preferred embodiment of said control loop (4). In this first preferred embodiment, without limiting the scope of the present invention, said control loop (4) corresponds to a current control that is synchronized with the network. For this purpose, said control loop (4) receives as a first input an input current to be injected into the network (601) and as a second input a measurement of the current to be injected into the network (602). In addition, the control loop (4) receives a synchronization signal having the same frequency and phase as the AC signal from the network (603). In response, the control loop (4) generates an output (604) that controls the switching state of the DC-DC converter (2).

FIG. 7 schematically illustrates a block corresponding to a second preferred embodiment of said control loop (4). In this second preferred embodiment, without limiting the scope of the present invention, said control loop (4) corresponds to a current and voltage control, where the current is synchronized with the network. For this purpose, said control loop (4) receives as a first input a DC reference voltage (701), as a second input a measurement of the DC voltage (702), and as a third input a measurement of the AC current to be injected into the network (703). In addition, the control loop (4) receives a synchronization signal having the same frequency and phase as the AC signal from the network (704). In response, the control loop (4) generates an output (705) that controls the switching state of the DC-DC converter (2).

Figure 8:
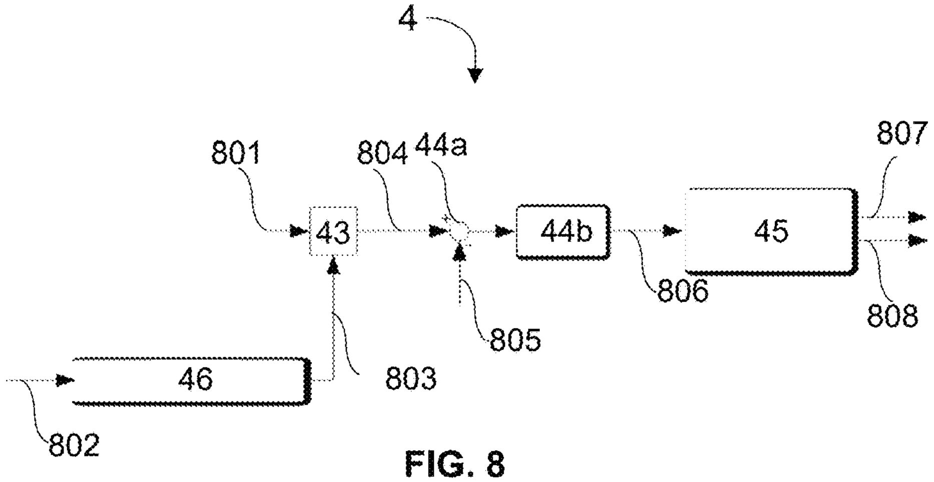
FIG. 8 schematically illustrates a third embodiment of the control loop forming part of the single-stage partial power inverter which is the subject matter of the present invention.
Figure 11:
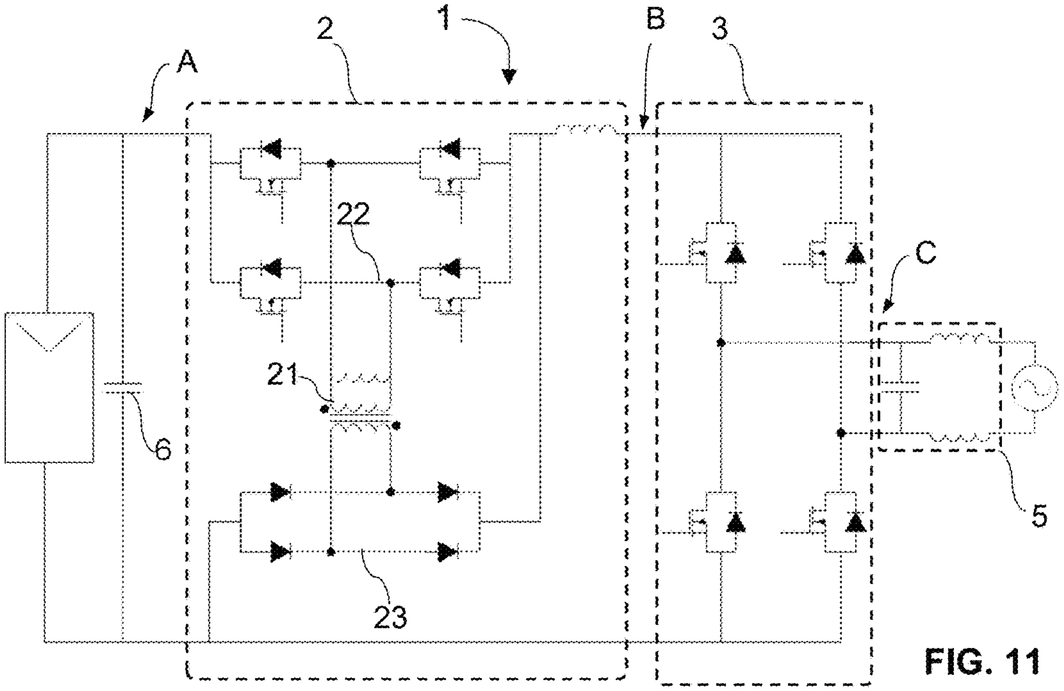
FIG. 11 schematically illustrates an exemplary embodiment of the single-stage partial power inverter which is the subject matter of the present invention.

FIG. 8 illustrates a third preferred embodiment of the control loop (4). In said preferred embodiment, without limiting the scope of the present invention, said control loop (4) may comprise a multiplier (43); a current comparator (44_a_) downstream of said multiplier (43); a compensator (44_b_) downstream of said current comparator (44_a_), and a switching signal generator (45) downstream of said compensator (44*b*). Said multiplier receives as first input (801) a DC voltage signal to be converted to AC. The second input of said multiplier (43) is a synchronization signal (803) having the same frequency and phase as the desired AC signal (802). For this purpose, said AC signal (802) is fed into a synchronization signal generator (46) which delivers said synchronization signal (803). In turn, said multiplier (43) delivers as output (804) a signal having an alternating waveform and in synchronism with the network. The current signal to be injected into the network (805) is subtracted from said output signal (804) of the multiplier (43). Said current signal to be injected into the network (805) has a sinusoidal waveform. The signal resulting from the comparison is fed into a second compensator (44*b*), the result of which (806) is fed into a switching signal generator (45). Said second compensator (44*b*), for example and without limiting the scope of the present invention, may be selected from a group consisting of proportional-integral compensator, proportional compensator, or resonant compensator. In the preferred embodiment illustrated, said switching signal generator (45) generates a first output (807) that controls the switching state of two switches of the H-bridge (22) of the DC-DC converter (2) illustrated in FIG. 11, and a second output (808) that controls the switching state of the other two switches of the H-bridge (22) of the DC-DC converter (2) illustrated in FIG. 11.

Figure 9:
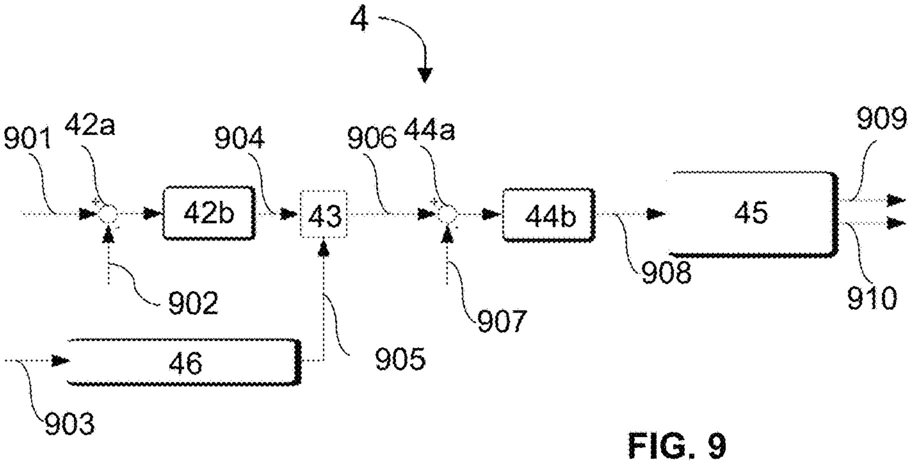
FIG. 9 schematically illustrates a fourth embodiment of the control loop forming part of the single-stage partial power inverter which is the subject matter of the present invention.

FIG. 9 illustrates a fourth preferred embodiment of the control loop (4). In said preferred embodiment, said control loop (4) may comprise a voltage comparator (42*a*); a compensator (42*b*) downstream of said voltage comparator (42*a*); a multiplier (43) downstream of said compensator (42*b*); a current comparator (44*a*) downstream of said multiplier (43); a second compensator (44*b*) downstream of said current comparator (44*a*), and a switching signal generator (45) downstream of said compensator (44*b*). Said voltage comparator (42*a*) receives as first input (901) a DC voltage signal to be converted to AC and as second input a voltage signal (902) that maximizes power transfer. The resulting signal is fed into a compensator (42*b*), whose result (904) is fed into a signal multiplier (43). Said voltage compensator (42*b*), for example and without limiting the scope of the present invention, may be a proportional-integral (PI) compensator. The second input of said multiplier (43) is a synchronization signal (905) having the same frequency and phase as the desired AC signal (903). For this purpose, said AC signal (903) is fed into a synchronization signal generator (46) which delivers said synchronization signal (905). In turn, said multiplier (43) delivers as output (906) a signal that is proportional to the DC current that maximizes the power transfer, but that has an alternating waveform and in synchronism with the network. The current signal to be injected into the network (907) is subtracted from said output signal (906) of the multiplier (43). Said current signal to be injected into the network (907) has a sinusoidal waveform. The signal resulting from the comparison is fed into a second compensator (44*b*), the result of which (908) is fed into a switching signal generator (45). Said second compensator (44*b*), for example and without limiting the scope of the present invention, may be selected from a group consisting of proportional-integral compensator, proportional compensator, or resonant compensator. In the preferred embodiment illustrated, said switching signal generator (45) generates a first output (909) that controls the switching state of two switches of the H-bridge (22) of the DC-DC converter (2) illustrated in FIG. 11, and a second output (910) that controls the switching state of the other two switches of the H-bridge (22) of the DC-DC converter (2) illustrated in FIG. 11.

Figure 10:
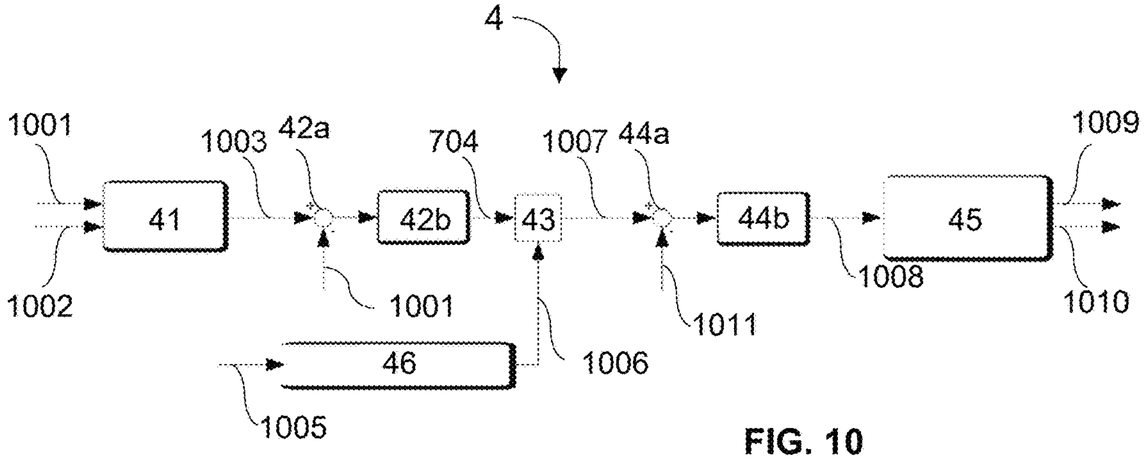
FIG. 10 schematically illustrates a fifth embodiment of the control loop forming part of the single-stage partial power inverter which is the subject matter of the present invention.

FIG. 10 illustrates a fifth preferred embodiment of the control loop (4). In said preferred embodiment, which may be used in applications in which the partial power inverter (1) which is the subject matter of the present invention is used in conjunction with a solar photovoltaic module (which is not illustrated in the figures), and without limiting the scope of the present invention, said control loop (4) may comprise a maximum power point tracker (41); a voltage comparator (42*a*) downstream of said maximum power point tracker (41); a compensator (42*b*) downstream of said voltage comparator (42*a*); a multiplier (43) downstream of said compensator (42*b*); a current comparator (44*a*) downstream of said multiplier (43); a second compensator (44*b*) downstream of said current comparator (44*a*), and a switching signal generator (45) downstream of said compensator (44*b*). Said maximum power point tracker (41) receives as first input (1001) a DC voltage signal to be converted to AC, and as second input (1002) a corresponding DC current signal. In this way, said maximum power point tracker (41) determines the DC voltage and current values to be delivered by the DC device connected to the input (A) of the partial power inverter (1) in such a way that the power transfer is maximized. Said maximum power point tracker (41) delivers, as output, a voltage signal (1003) that maximizes said power transfer. The voltage signal present at the first input (1001) of the maximum power point tracker (41) is subtracted from said voltage signal (1003) that maximizes said power transfer. Said resulting signal is fed into a compensator (42*b*), the result of which (1004) is fed into a signal multiplier (43). Said voltage compensator (42*b*), for example and without limiting the scope of the present invention, may be a proportional-integral (PI) compensator. The second input of said multiplier (43) is a synchronization signal (1006) having the same frequency and phase as the AC signal (1005) to be obtained. For this purpose, said AC signal (1005) is fed into a synchronization signal generator (46) which delivers said synchronization signal (1006). In turn, said multiplier (43) delivers as output (1007) a signal that is proportional to the DC current that maximizes the power transfer, but that has an alternating waveform and in synchronism with the network. The current signal to be injected into the network (1011) is subtracted from said output signal (1007) of the multiplier (43). Said current signal to be injected into the network (1011) has a sinusoidal waveform. The signal resulting from the comparison is fed into a second compensator (44*b*), the result of which (1008) is fed into a switching signal generator (45). Said second compensator (44*b*), for example and without limiting the scope of the present invention, may be selected from a group consisting of proportional-integral compensator, proportional compensator, or resonant compensator. In the preferred embodiment illustrated, said switching signal generator (45) generates a first output (1009) that controls the switching state of two switches of the H-bridge (22) of the DC-DC converter (2) illustrated in FIG. 11, and a second output (1010) that controls the switching state of the other two switches of the H-bridge (22) of the DC-DC converter (2) illustrated in FIG. 11.

In this way, it is possible to control said DC-DC converter (2) in a partial power configuration such that the signal obtained at its output (B) has a rectified AC waveform, as schematically illustrated in FIG. 5B.

The partial power inverter (1) which is the subject matter of the present invention may comprise, additionally and without limiting the scope of the present invention, a filter (6) connected to the voltage input (A) of the DC-DC converter (2). Said filter (6) may be an active filter or a passive filter, as well as a combination thereof without limiting the scope of the present invention. In a preferred embodiment, without limiting the scope of the present invention, said filter (6) may be a capacitive filter.

In a preferred embodiment, without limiting the scope of the present invention, the partial power inverter (1) which is the subject matter of the present invention, may comprise a plurality of galvanically isolated DC-DC converters, wherein each of said plurality of galvanically isolated DC-DC converters is arranged in a partial power configuration. In this preferred embodiment, without limiting the scope of the present invention, each of said plurality of galvanically isolated DC-DC converters has a voltage input and a voltage output. Furthermore, said plurality of galvanically isolated DC-DC converters may be connected to each other in a configuration that is selected from a group consisting of input-series, output-series (ISOS); input-series, output-parallel (ISOP); input-parallel, output-series (IPOS); and input-parallel, output-parallel (IPOP).

In this preferred embodiment, without limiting the scope of the present invention, the control loop (4) is configured to control the switching cycle of each of said plurality of galvanically isolated DC-DC converters. Said control loop (4) is configured to control said switching cycle of each of said plurality of galvanically isolated DC-DC converters such that the voltage signal at each of said voltage outputs of said plurality of galvanically isolated DC-DC converters has a rectified AC waveform with a frequency which is twice the fundamental frequency of said AC signal. In this way, it is possible, for example and without limiting the scope of the present invention, to increase the power obtained at the output of the partial power inverter (1) which is the subject matter of the present invention, which may have an application, for example, in the field of power generation.

According to the previously detailed description, it is possible to obtain a single-stage partial power inverter (1) which makes it possible to satisfy the requirements of the prior art.

It should be understood that the various options described for the technical characteristics of the single-stage partial power inverter (1), which is the subject matter of the present invention, may be combined with each other, or with others known to a person ordinarily skilled in the art, in any manner envisaged without limiting the scope of the present invention.

The invention claimed is:

1. A single-stage partial power inverter (1) for transforming a DC signal into an AC signal, the single-stage partial power inverter (1) comprising:

a galvanically isolated DC-DC converter (2) in a partial power configuration, having a voltage input (A) and a voltage output (B);

an inverter bridge (3) connected to said voltage output (B) of said DC-DC converter (2) in the partial power configuration; and a control loop (4), configured to control a switching cycle of said DC-DC converter (2), wherein said control loop (4) is configured to control said switching cycle of said DC-DC converter (2) such that a voltage signal at said voltage output (B) has a rectified AC waveform, said rectified AC waveform having a frequency that is twice a fundamental frequency of said AC signal, and wherein said inverter bridge (3) is operated at a switching frequency that is twice the fundamental frequency of said AC signal.

2. The single-stage partial power inverter (1) of claim 1, further comprising a filter (5) downstream of said inverter bridge (3).

3. The single-stage partial power inverter (1) of claim 2, wherein said filter (5) is an inductive-capacitive filter, and wherein said inductive-capacitive filter is designed to filter harmonics from the AC signal.

4. The single-stage partial power inverter (1) of claim 1, further comprising a filter (6) connected to said voltage input (A) of said DC-DC converter (2).

5. The single-stage partial power inverter (1) of claim 4, wherein said filter (6) is a capacitive filter.

6. The single-stage partial power inverter (1) of claim 1, wherein said DC-DC converter (2) is selected from a group consisting of forward converters, push-pull converters, H-bridge converters, flyback converters, half bridge converters, and Cuk converters.

7. The partial power inverter (1) of claim 1, further comprising a plurality of galvanically isolated DC-DC converters, each of said plurality of galvanically isolated DC-DC converters in the partial power configuration, each of said plurality of galvanically isolated DC-DC converters having a voltage input and a voltage output, wherein said plurality of galvanically isolated DC-DC converters are connected to each other in a configuration which is selected from a group consisting of:

input-series, output-series (ISOS);

input-series, output-parallel (ISOP);

input-parallel, output-series (IPOS); and input-parallel, output-parallel (IPOP), wherein said control loop (4) is configured to control a switching cycle of each of said plurality of galvanically DC-DC converters, and wherein said control loop (4) is configured to control said switching cycle of each of said plurality of galvanically DC-DC converters such that a voltage signal at each of said voltage outputs of said plurality of galvanically DC-DC converters has a rectified AC waveform with a frequency that is twice the fundamental frequency of said AC signal.

8. The partial power inverter (1) of claim 1, wherein said control loop (4) comprises:

a multiplier (43);

a current comparator (44*a*) downstream of said multiplier (43); and a switching signal generator (45) downstream of said current comparator (44*a*), wherein said multiplier (43) receives as a first input a DC input signal (801) and as a second input a sinusoidal signal with a frequency and phase of said AC signal (806).

9. The partial power inverter (1) of claim 1, wherein said control loop (4) comprises:

a voltage comparator (42*a*);

a multiplier (43) downstream of said voltage comparator (42);

a current comparator (44) downstream of said multiplier (43); and a switching signal generator (45) downstream of said current comparator (44), wherein said voltage comparator (42*a*) receives as a first input a DC input signal (901) and as a second input a DC voltage signal that maximizes power transfer (902); and wherein said multiplier (43) receives as a first input the output signal of said voltage comparator and as a second input a sinusoidal signal with a frequency and phase of said AC signal (905).

10. The partial power inverter (1) of claim 1, wherein said control loop (4) comprises:

a maximum power point tracker (41);

a voltage comparator (42) downstream of said maximum power point tracker (41);

a multiplier (43) downstream of said voltage comparator (42);

a current comparator (44) downstream of said multiplier (43); and a switching signal generator (45) downstream of said current comparator (44), and wherein said multiplier (43) receives as a first input the output signal of said voltage comparator and as a second input a sinusoidal signal with a frequency and phase of said AC signal.

11. The single-stage partial power inverter (1) of claim 2, wherein said filter (5) is an active filter or a passive filter.

12. The single-stage partial power inverter (1) of claim 4, wherein said filter (6) is an active filter or a passive filter.

* * * * *